US010052986B2

(12) United States Patent
Sato et al.

(10) Patent No.: US 10,052,986 B2
(45) Date of Patent: Aug. 21, 2018

(54) COVER ANCHOR CLIP

(71) Applicants: NIFCO INC., Yokosuka-shi, (Kanagawa) (JP); TOYOTA BOSHOKU KABUSHIKI KAISHA, Kariya-shi (Aichi) (JP)

(72) Inventors: Takehiro Sato, Yokosuka (JP); Ryuji Tsunoda, Yokosuka (JP); Ryo Yasuda, Kariya (JP)

(73) Assignees: NIFCO INC., Kanagawa (JP); TOYOTA BOSHOKU KABUSHIKI KAISHA, Aichi (JP)

( * ) Notice: Subject to any disclaimer, the term of this patent is extended or adjusted under 35 U.S.C. 154(b) by 189 days.

(21) Appl. No.: 15/081,336

(22) Filed: Mar. 25, 2016

(65) Prior Publication Data
US 2016/0280107 A1 Sep. 29, 2016

(30) Foreign Application Priority Data

Mar. 27, 2015 (JP) .................................. 2015-066228

(51) Int. Cl.
- A41F 1/00 (2006.01)
- B60N 2/58 (2006.01)
(Continued)

(52) U.S. Cl.
CPC ........ B60N 2/5825 (2013.01); B29C 45/0025 (2013.01); B60N 2/5891 (2013.01);
(Continued)

(58) Field of Classification Search
CPC ................ B60N 2/5825; B60N 2/5891; B29C 45/0025; B29C 2045/0039; B29L 2031/7282
See application file for complete search history.

(56) References Cited

U.S. PATENT DOCUMENTS 4,646,916 A * 3/1987 Ishida ................. B29C 45/0025
206/387.1
6,071,463 A * 6/2000 De'ath .................. B29C 37/005
264/328.16
(Continued)

FOREIGN PATENT DOCUMENTS

DE 20 2005 013339 U1 11/2005
FR 3021006 A1 * 11/2015 ............. B29C 70/72
(Continued)

OTHER PUBLICATIONS

Extended European Search Report (EESR) Application No. 16161255.1-1653 dated Jul. 27, 2016, 9 pages.
Japanese Office Action dated Dec. 5, 2017 for corresponding Japanese Application No. 2015-066228, 5 pages.

Primary Examiner — Victor D Batson
Assistant Examiner — Matthew J Sullivan
(74) Attorney, Agent, or Firm — Thomas | Horstemeyer, LLP

(57) ABSTRACT

A cover anchor clip includes a base section having a plate shape extending in one direction, that is formed with through holes into which a foam body enters, and that is configured to be retained in the foam body; and an anchor portion including a pair of extension portions that extend upward from a surface of the base section and that are disposed facing each other, and a pair of anchor claws that are formed at respective leading ends of the pair of extension portions, and that is configured to anchor an anchored member attached to a cover for covering the foam body by sandwiching the anchored member therebetween. The through holes formed at the base section are aligned in the one direction, and plural hole-rows formed by the through holes aligned in the one direction are disposed separated by a spacing in an intersection direction intersecting the one direction. A gate mark that indicates an injection port for resin material during molding is formed at the back face of (Continued)

the base section between adjacent hole-rows. A plate thickness changing portion at which a thickness of the base section changes is formed between the gate mark and the through holes, as viewed from a back face of the base section along a plate thickness direction of the base section.

6 Claims, 15 Drawing Sheets

(51) Int. Cl.
  *B29C 45/00* (2006.01)
  *F16B 2/22* (2006.01)
  *B29L 31/00* (2006.01)
(52) U.S. Cl.
  CPC ........ *F16B 2/22* (2013.01); *B29C 2045/0039* (2013.01); *B29L 2031/7282* (2013.01)

(56) References Cited

U.S. PATENT DOCUMENTS

| | | | |
|---|---|---|---|
| 8,690,257 B2 * | 4/2014 | Stiller | B60N 2/5825 24/297 |
| 2010/0117434 A1 | 5/2010 | Galbreath et al. | |
| 2016/0198811 A1 * | 7/2016 | Mahe | B29C 44/1271 24/444 |

FOREIGN PATENT DOCUMENTS

| | | |
|---|---|---|
| JP | S62-240521 | 10/1987 |
| JP | S64-011219 | 1/1989 |
| JP | H02-225012 | 9/1990 |
| JP | 2011 055996 A | 3/2011 |
| JP | 2013-132328 | 7/2013 |

* cited by examiner

COVER ANCHOR CLIP

CROSS-REFERENCE TO RELATED APPLICATION

This application claims priority under 35 USC 119 from Japanese Patent Application No. 2015-66228 filed Mar. 27, 2015, the disclosure of which is incorporated by reference herein in its entirely.

BACKGROUND

Technical Field

Preferred embodiments relate to a cover anchor clip.

Related Art

A clip (cover anchor clip) described in JPA No. 2013-132328 includes a plate shaped base section retained in a foam body, a pair of opposing wall portions that extend upward from the base section, anchor portions provided capable of elastic deformation toward the outside of the wall portions, and anchor claws that project out from inner faces of the anchor portions, and that anchor a fixed member attached to a seat cover for covering the foam body and inserted between the wall portions. The cover anchor clip is employed in a vehicle seat.

Plural through holes are formed in the base section, into which the foam body enters.

The clip is molded using an injection molding process. Weld lines originating at the edges of the through holes that are formed in the base section thereby develop around the through holes. Note that weld lines refers to portions where the flow of molten resin in a mold has merged and fused in the injection molding process, and compared to other portions, are locations more liable to break under external load.

Here, it is conceivable that when weld lines that have developed at the periphery of adjacent through holes extend in the same direction, as viewed along a plate thickness direction of the base section, the base section might break along these weld lines in the event that external force was applied to the clip.

SUMMARY

An object of preferred embodiments is to suppress damage to a clip originating at weld lines.

A cover anchor clip of a first aspect of the present invention includes: a base section having a plate shape extending in one direction, that is formed with through holes into which a foam body enters, and that is retained in the foam body; and an anchor portion including a pair of extension portions that extend upward from a surface of the base section and that are disposed facing each other, and a pair of anchor claws that are formed at respective leading ends of the pair of extension portions, and that anchor an anchored member attached to a cover for covering the foam body by sandwiching the anchored member therebetween. The through holes formed at the base section are aligned in the one direction, and plural hole-rows formed by the through holes aligned in the one direction are separated by a spacing in an intersection direction that intersects the one direction. A gate mark that indicates an injection port for resin material during molding is formed at a back face of the base section between adjacent hole-rows of the hole-rows. A plate thickness changing portion at which a thickness of the base section changes is formed between the gate mark and the through holes, as viewed from the back face of the base section along a plate thickness direction of the base section.

In the above configuration, the thickness changing portion at which the thickness of the base section changes is formed between the gate mark and the through holes as viewed from the back face of the base section along a plate thickness direction of the base section. Weld lines that have developed at a periphery of adjacent through holes can thereby be made to extend in different directions from each other. Damage to the clip originating at weld lines can thereby be suppressed.

A cover anchor clip of a second aspect of the present invention is the cover anchor clip of the first aspect, wherein the plate thickness changing portion is shaped as a curved line as viewed along the plate thickness direction.

In the above configuration, the plate thickness changing portion is shaped from a curved line, as viewed along the plate thickness direction. Weld lines can thereby be made to extend in different directions from each other, and damage to the clip originating at weld lines can be effectively suppressed.

A cover anchor clip of a third aspect of the present invention is the cover anchor clip of the first aspect, wherein the plate thickness changing portion is shaped by a straight line portion and an angular portion as viewed along the plate thickness direction.

In the above configuration, the plate thickness changing portion is shaped by the straight line portion and the angular portion as viewed along the plate thickness direction. Weld lines can thereby be made to extend in different directions from each other, and damage to the clip originating at weld lines can be effectively suppressed.

A cover anchor clip of a fourth aspect of the present invention is the cover anchor clip of the first aspect, wherein the plate thickness changing portion extends in the intersection direction.

In the above configuration, weld lines can be made to extend in different directions from each other, and damage to the clip originating at weld lines can be effectively suppressed.

A cover anchor clip of a fifth aspect of the present invention is the cover anchor clip of the first aspect, wherein the plate thickness changing portion is formed at one side in the one direction and at another side in the one direction, with the gate mark lying therebetween, and the plate thickness of the base section between two plate thickness changing portions is thicker than that of other portions of the base section.

In the above configuration also, weld lines can be made to extend in different directions from each other, and damage to the clip originating at weld lines can be effectively suppressed.

The preferred embodiments of the disclosure suppress damage to a clip originating at weld lines.

BRIEF DESCRIPTION OF THE DRAWINGS

Preferred embodiments will be described in detail based on the following figures, wherein.

DETAILED DESCRIPTION

Figure 1:
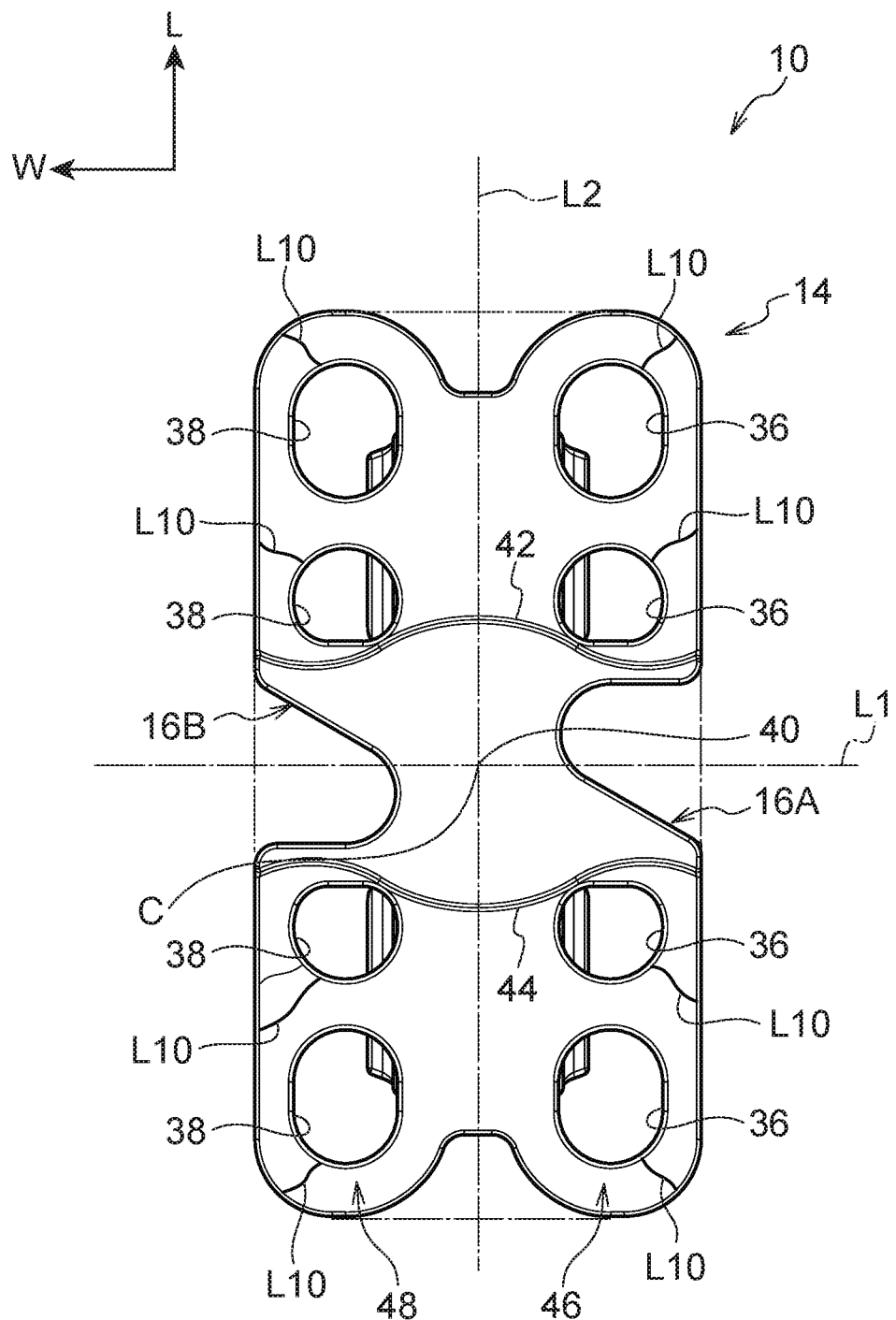
FIG. 1 is a bottom view illustrating a clip according to an exemplary embodiment of the present invention.

Explanation follows regarding an example of a cover anchor clip according to an exemplary embodiment of the present invention, with reference to FIG. 1 to FIG. 15. Note that in the drawings, the arrow H indicates an up-down direction of the cover anchor clip, the arrow W indicates a width direction of the cover anchor clip, and the arrow L indicates a front-rear direction of the cover anchor clip.

Overall Configuration

Figure 13:
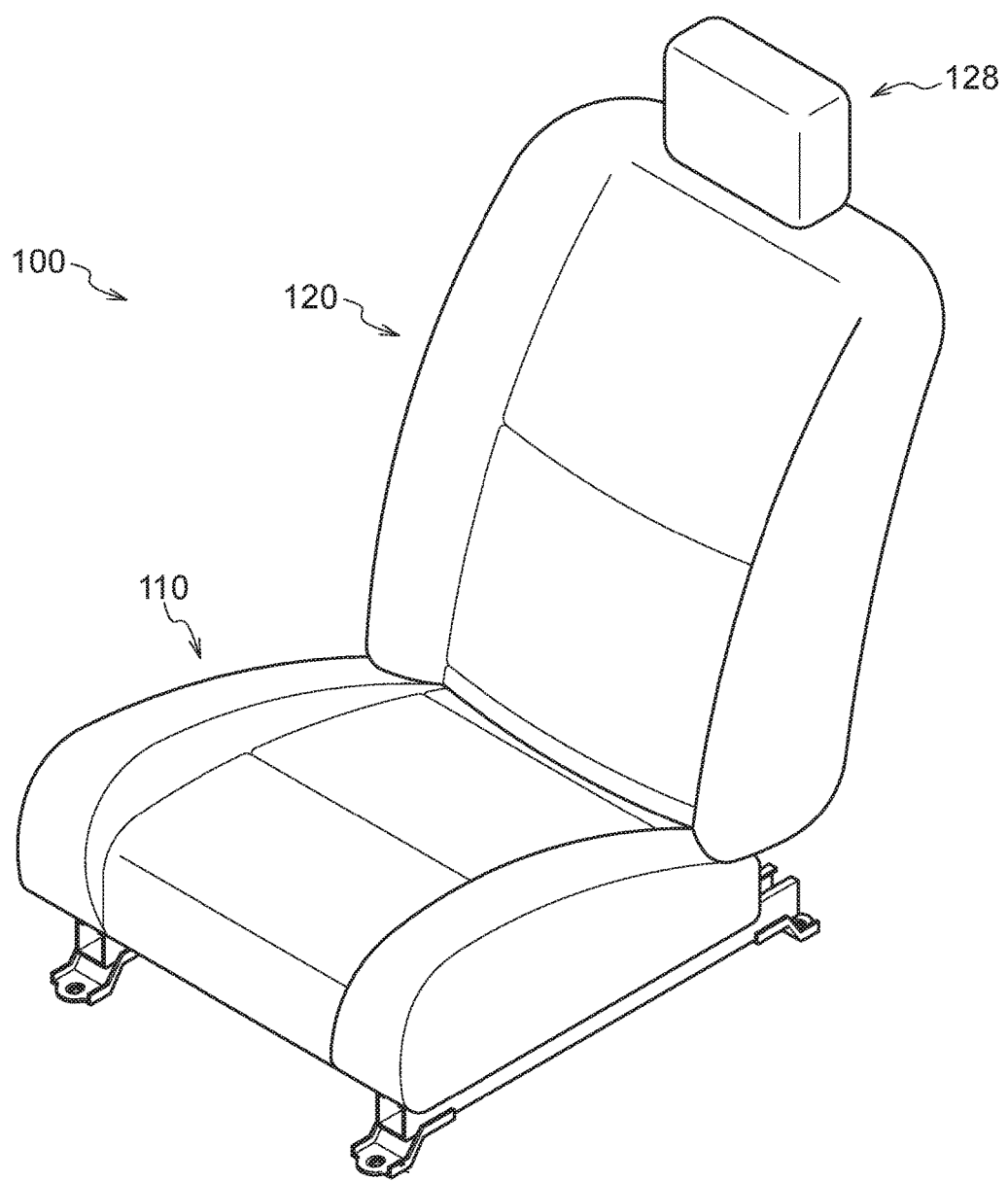
FIG. 13 is a perspective view illustrating a seat employing a clip according to an exemplary embodiment of the present invention.

First, explanation follows regarding a vehicle seat 100 in which a cover anchor clip 10 (referred to below simply as "clip 10") is employed. As illustrated in FIG. 13, the seat 100 includes a cushion section 110, a back section 120, and a headrest 128 that respectively support the buttocks or the like, the back and lumbar region or the like, and the head of an occupant.

Figure 12:
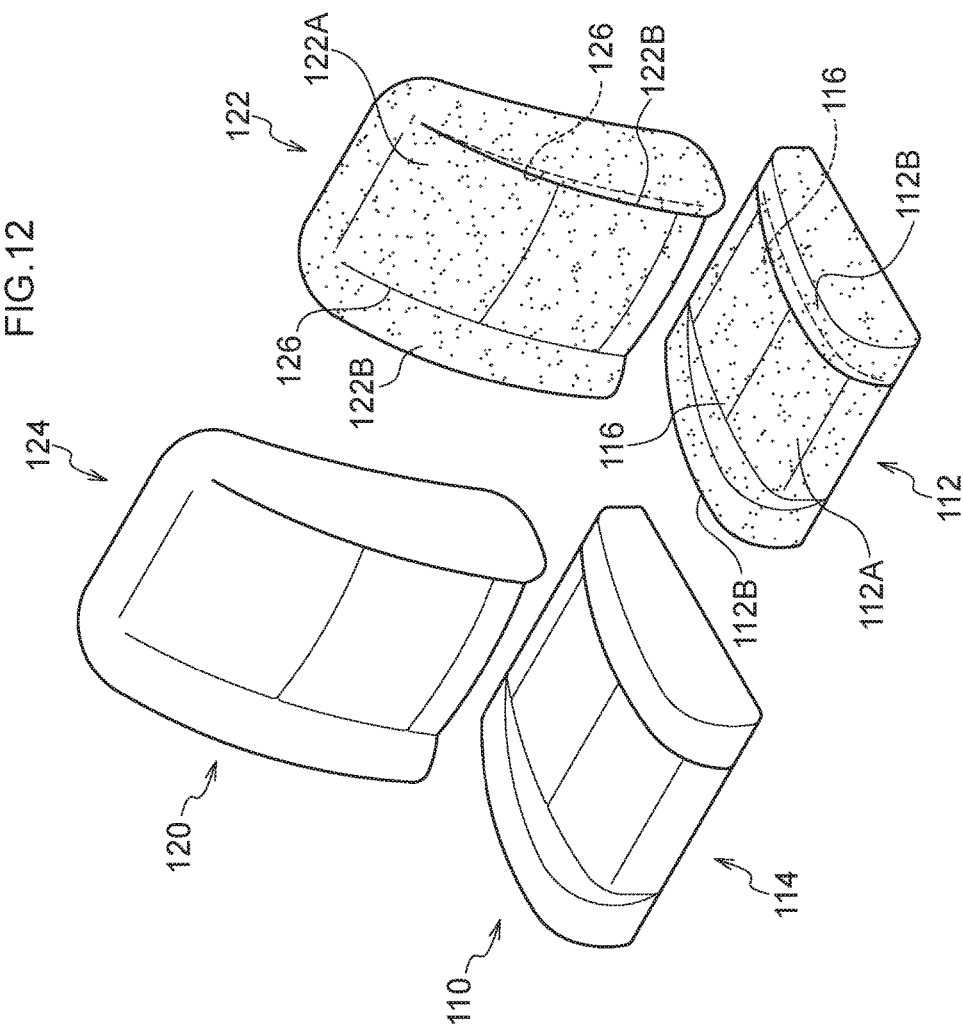
FIG. 12 is an exploded perspective view illustrating a seat employing a clip according to an exemplary embodiment of the present invention.

As illustrated in FIG. 12, the cushion section 110 includes a cushion 112 (an example of a foam body) and a cover 114. Moreover, the cushion 112 includes a main portion 112A and a pair of support portions 112B disposed on either side of the main portion 112A in the width direction thereof.

Grooves 116 are formed between the respective support portions 112B and the main portion 112A, and the clips 10 are disposed at a bottom of the grooves 116. Specifically, when foam molding the cushion 112, the clips 10 are inserted in the mold so as to dispose the clips 10 at the bottom of the grooves 116 (see FIG. 7).

Figure 10:
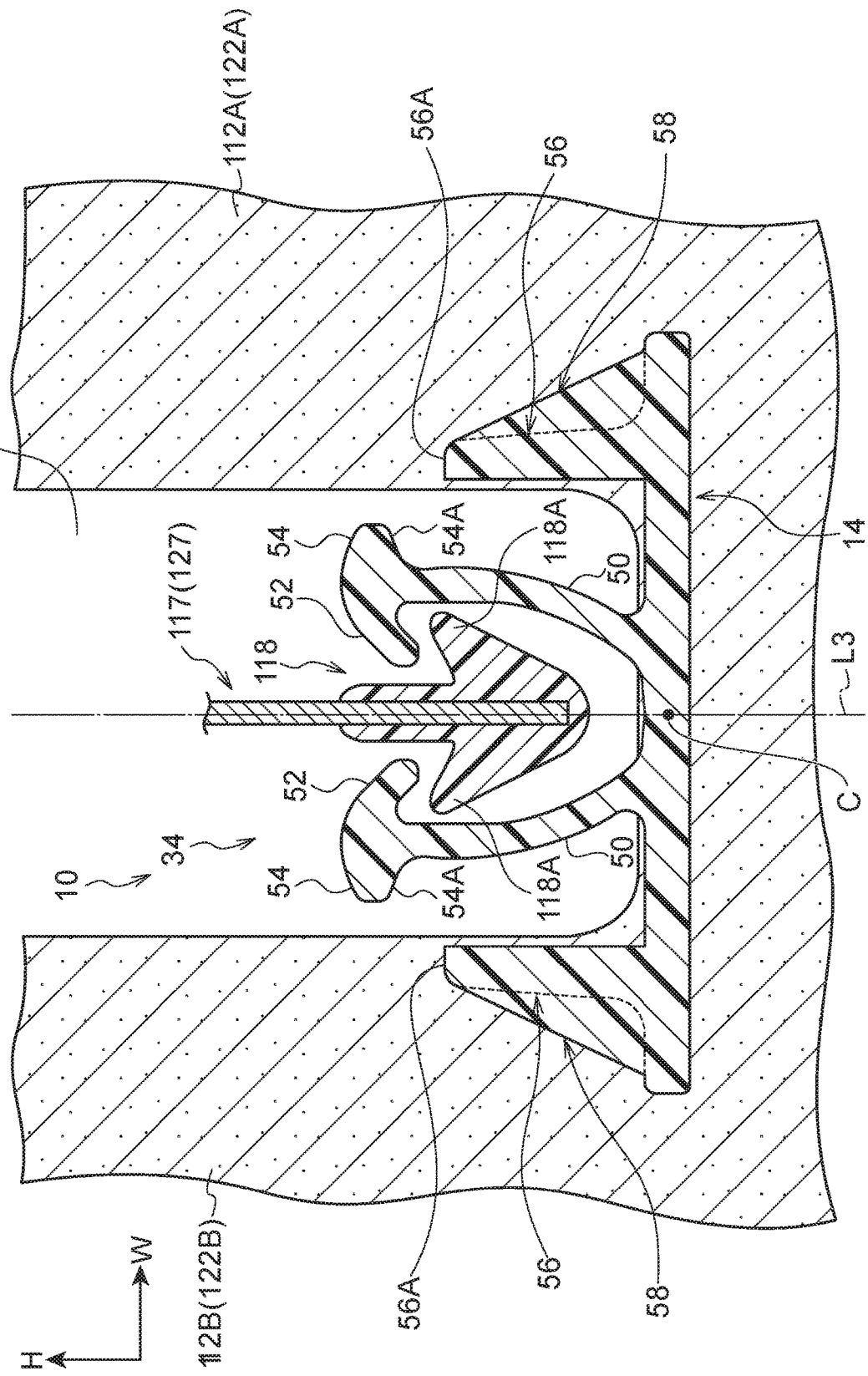
FIG. 10 is a cross-section illustrating a clip according to an exemplary embodiment of the present invention.

Suspenders 118, serving as examples of an anchored portion and fixed to a sheet member 117 attached to the cover 114, are attached to the clips 10 (see FIG. 10). Note that the suspenders 118 and the clips 10 are described in detail later.

Similarly, as illustrated in FIG. 12, the back section 120 includes a cushion 122 (an example of a foam body) and a cover 124. The cushion 122 includes a main portion 122A and a pair of support portions 122B disposed on either side of the main portion 122A in the width direction thereof.

Grooves 126 are formed between the respective support portions 122B and the main portion 122A, and the clips 10 are disposed at a bottom of the grooves 126. Specifically, when foam molding the cushion 122, the clips 10 are inserted in the mold so as to dispose the clips TO at the bottom of the grooves 126 (see FIG. 7).

Suspenders 118, that are fixed to a sheet member 127 attached to the cover 124, are attached to the clip 10 (see FIG. 10). Note that the suspenders 118 and the clips 10 are described in detail later.

Suspender

Each of the suspenders 118 extends along a bottom face of the groove 116, 126 and is tapered at a leading end side, as illustrated in FIG. 10. A pair of protrusions 118A are formed projecting toward the outside (left-right direction sides in FIG. 10) at a portion on a base end side of each suspender 118.

Clip

Figure 6:
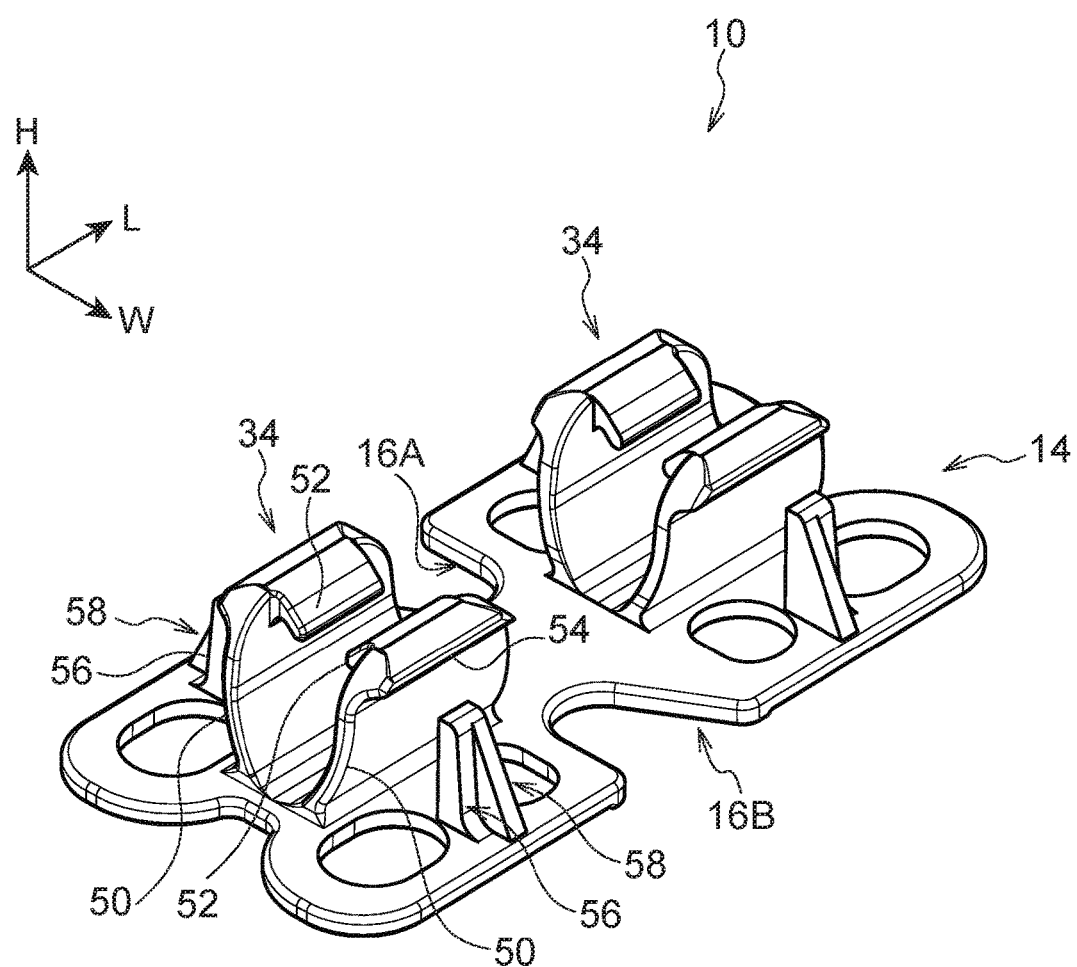
FIG. 6 is a perspective view illustrating a clip according to an exemplary embodiment of the present invention, as viewed from a lower side.

The clip 10 is integrally formed from a resin material using an injection molding process, and as illustrated in FIG. 6, includes a plate shaped base section 14 that is retained by the cushions 112, 122 (see FIG. 12), and two anchor portions 34 extending out from the base section 14 toward the upper side.

Base Section

Figure 5:
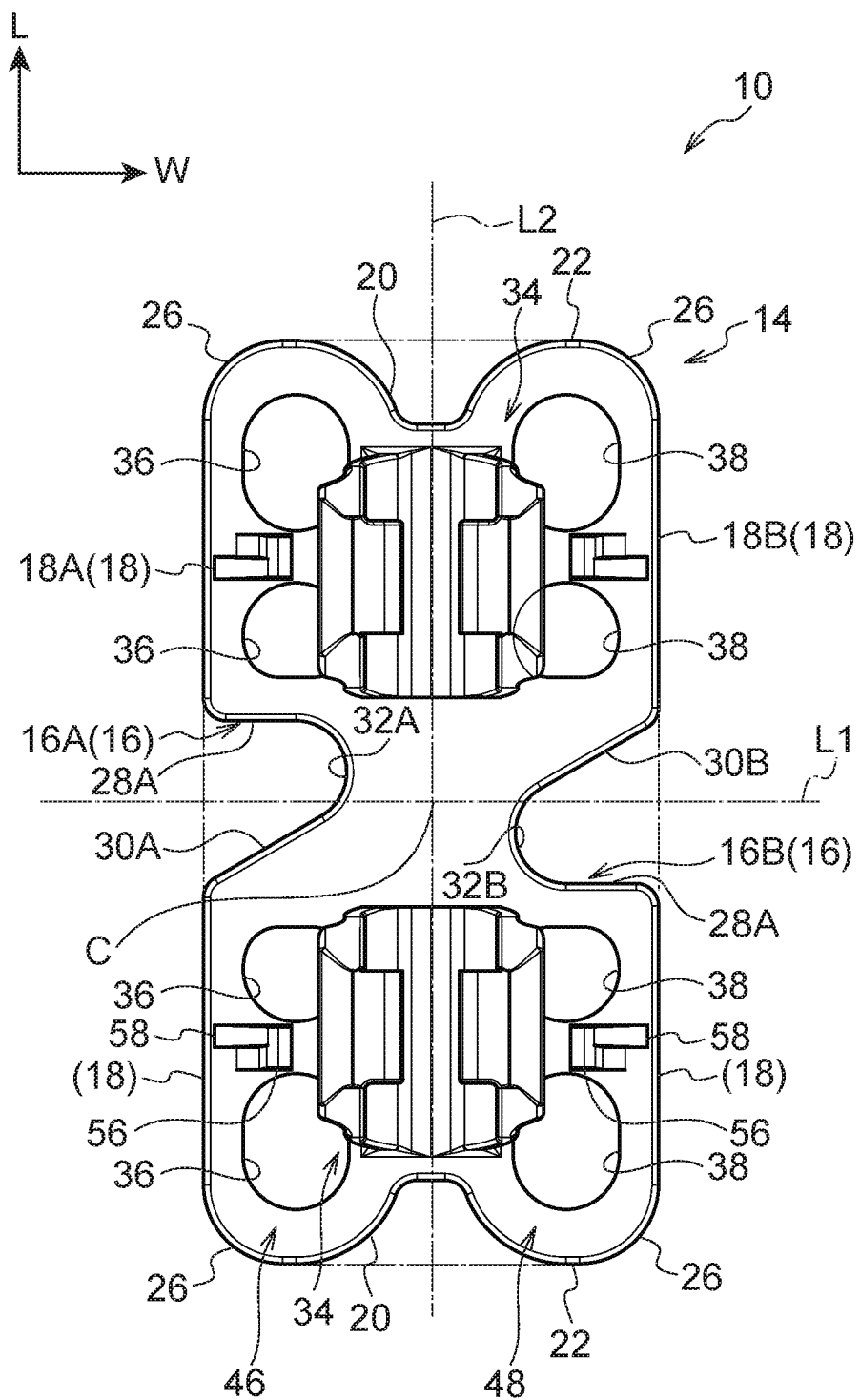
FIG. 5 is a plan view illustrating a clip according to an exemplary embodiment of the present invention.

A plate face of the base section 14 faces in the up-down direction and extends in the front-rear direction ((an example of one direction), and the base section 14 is formed by a rectangular plate body extending in the front-rear direction. Furthermore, as illustrated in FIG. 5, the base section 14 includes a pair of edges 18 that extend in the front-rear direction and that are each formed with a notch 16, and a pair of edges 22 that couple the pair of edges 18 together at both end portions thereof and that are each formed with a notch 20.

Specifically, the respective edges 18 and the respective edges 22 are coupled together through circular arc shaped edges 26. Moreover, the notch 20 formed to one of the edges 22 and the notch 20 formed to the other of the edges 22 are each has recessed shape as viewed from the upper side in a plate thickness direction of the base section 14 and are formed symmetrically to each other about a center line L1 of the base section 14 extending in the width direction. Note that the center line L1 passes through the center C (centroid) of the base section 14, and is a straight line extending in the width direction.

A notch 16A formed to one of the edges 18A and a notch 16B formed to the other of the edges 18B are each has recessed shapes as viewed from the upper side and are disposed at a central portion in the front-rear direction. The notch 164 and the notch 16B are asymmetrical to each other about a center line L2 of the base section 14 extending in the front-rear direction. Note that the center line L2 passes through the center C (centroid) of the base section 14, and is a straight line extending in the front-rear direction.

The notches 16A, 16B include straight line portions 28A, 28B extending in the width direction, angled portions 30A, 30B angled with respect to the width direction, and circular arc portions 32A, 32B that couple leading end sides of the straight line portions 28A, 28B together with leading end sides of the angled portions 30A, 30B. In the present exemplary embodiment, as viewed from the upper side, the notch 16A and the notch 16B are formed with point symmetry about the center C of the base section 14, and the circular arc portion 324 of the notch 16A is disposed on one side of the center line L1, and the circular arc portion 32B of the notch 16B is disposed on the other side of the center line L1.

Moreover, the base section 14 is formed with a hole-row 46 configured from four through holes 36 aligned in the front-rear direction along the one edge 18A, and is formed with a hole-row 48 configured from four through holes 38 aligned in the front-rear direction along the other edge 18B. Namely, the hole-row 46 and the hole-row 48 are disposed separated by a spacing in the width direction (an example of an intersection direction) intersecting the front-rear direction.

Figure 11:
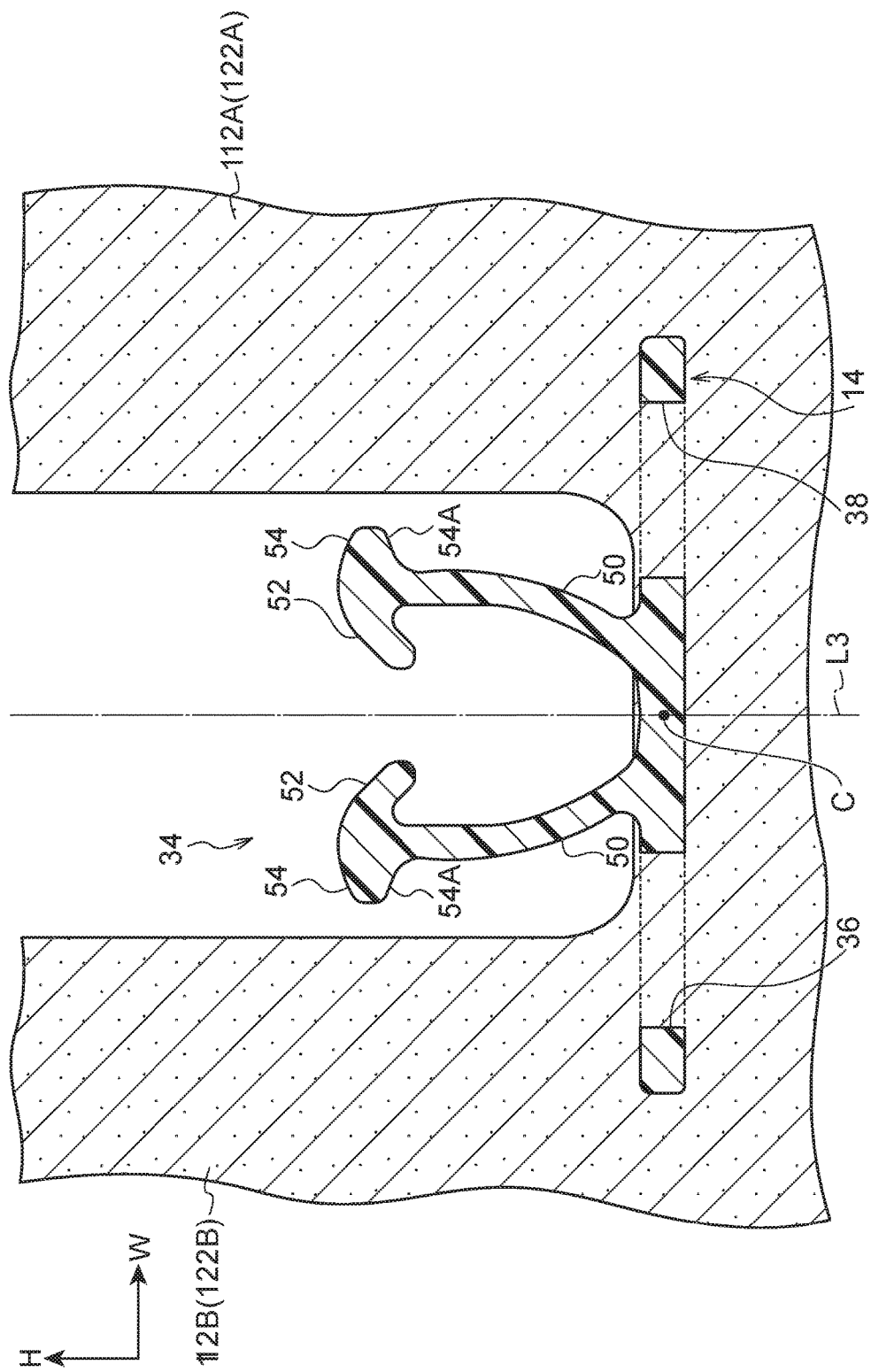
FIG. 11 is a cross-section illustrating a clip according to an exemplary embodiment of the present invention.

The foam bodies enter the through holes 36, 38 (see FIG. 12) during foam molding of the cushions 112, 122 (see FIG. 11).

Figure 2:
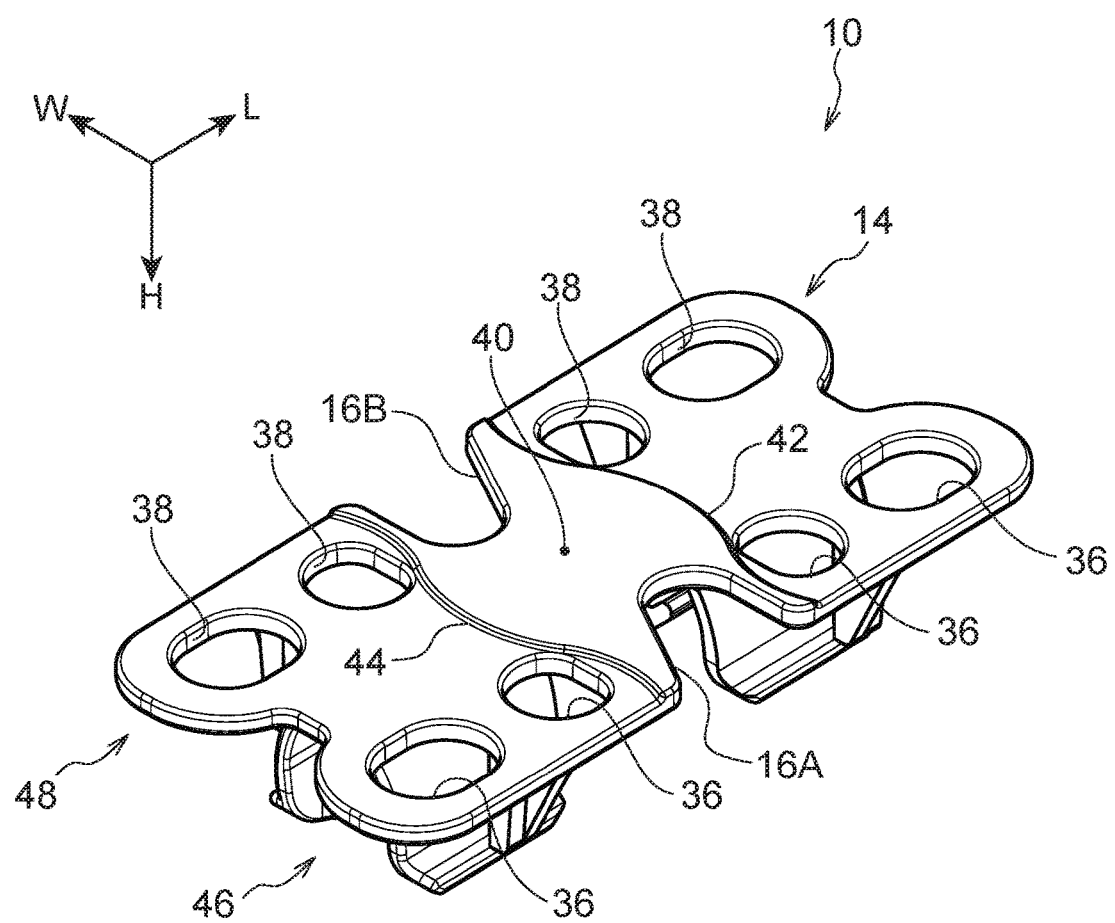
FIG. 2 is a perspective view illustrating a clip according to an exemplary embodiment of the present invention, as viewed from an upper side.

As illustrated in FIG. 2, step portions 42, 44 (examples of portions at which a plate thickness changes) at which the plate thickness of the base section 14 changes are formed to a back face of the base section 14, that is an opposite side face to the face on which the anchor portions 34 are disposed. In the present exemplary embodiment, a front-rear direction central portion of the base section 14 has a plate thickness of 1.2 mm, and other general portions of the base section 14 have a plate thickness of 1.0 mm.

Specifically, viewing the cover anchor clip 10 from the lower side, as illustrated in FIG. 1, the step portion 42 is disposed on one side of the center line L1, and the step portion 44 is disposed on the other side of the center line L2. A portion of the base section 14 between the step portion 42 and the step portion 44 has a plate thickness of 1.2 mm. The step portions 42, 44 are curved (extend in a curve with respect to the center line L1, as viewed from the lower side.

Figure 3:
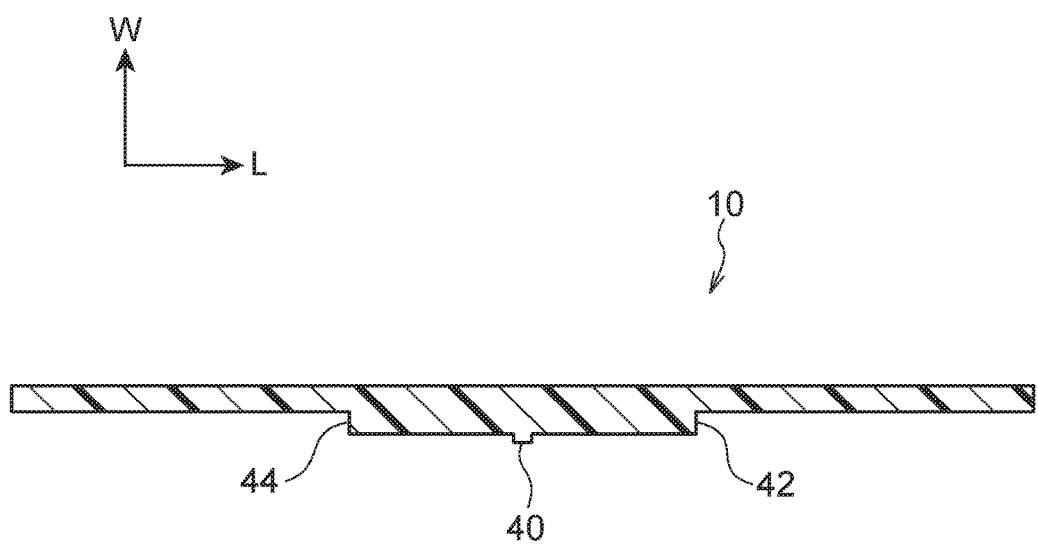
FIG. 3 is a cross-section illustrating a clip according to an exemplary embodiment of the present invention.
Figure 4:
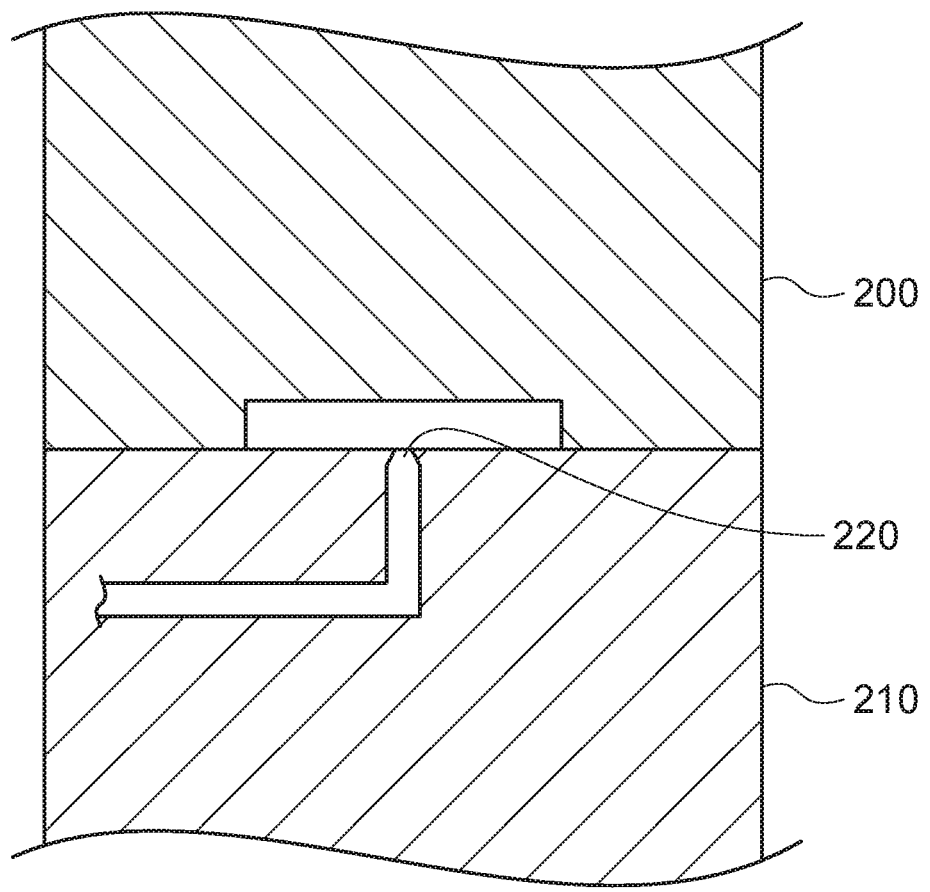
FIG. 4 is a cross-section illustrating a mold for forming a clip according to an exemplary embodiment of the present invention.

Moreover, viewing the back face of the base section 14 from the lower side, as illustrated in FIG. 2 and FIG. 3, agate mark 40 that indicates an injection port for resin material is formed at a portion at a front-rear direction central position between the adjacent hole-row 46 and hole-row 48. As illustrated in FIG. 4, the gate mark 40 indicates a location configuring an injection port 220 for resin material in a state in which a mold 200 and a mold 210 have been closed. Furthermore, in a state in which the gate has been cut, as illustrated in FIG. 3, the gate mark 40 projects out from a general face of the base section 14.

Figure 7:
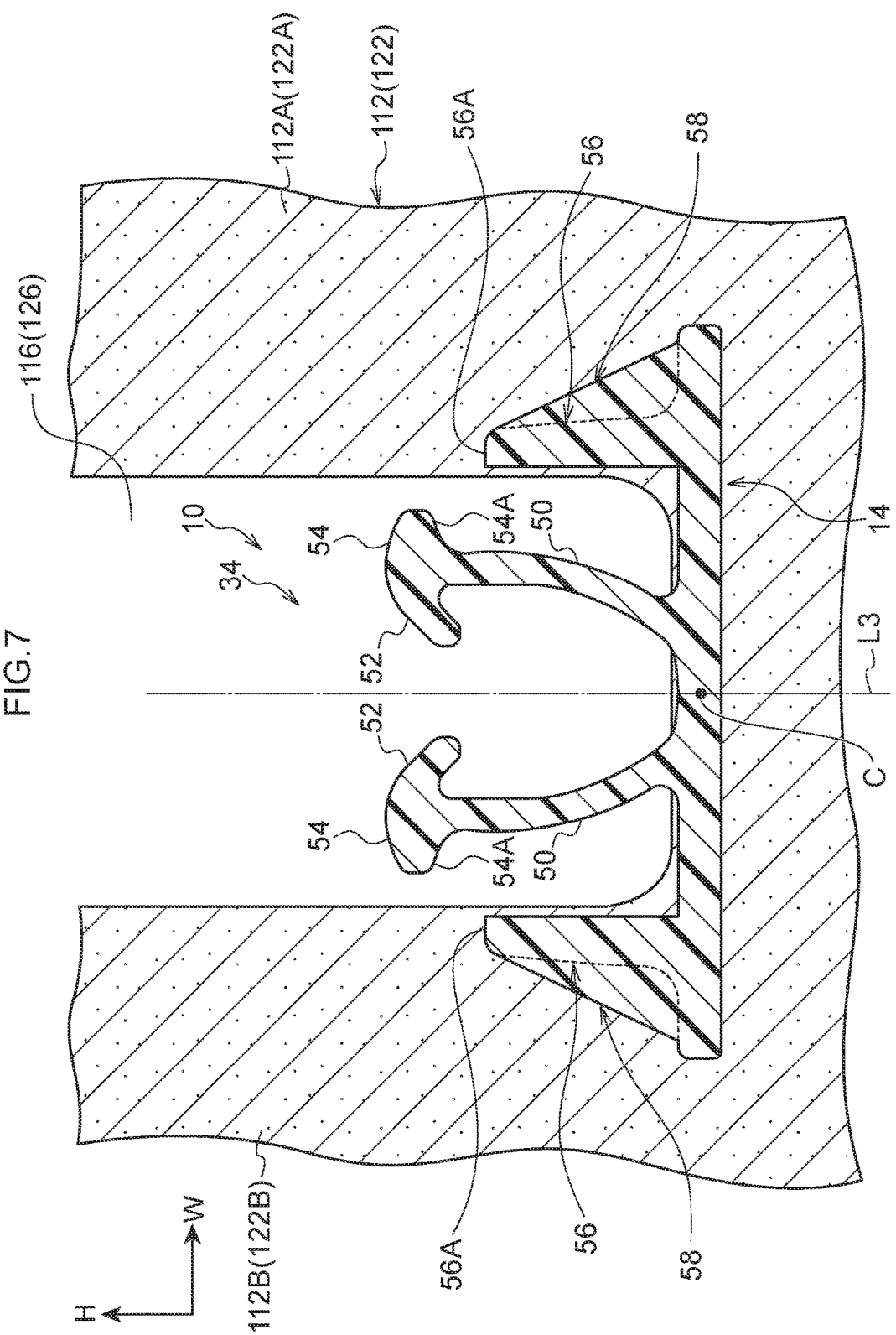
FIG. 7 is a cross-section illustrating a clip according to an exemplary embodiment of the present invention.

In this configuration, in a state in which the respective clips 10 are disposed in the cushions 112, 122, as illustrated in FIG. 7, the base sections 14 are disposed so as to extend running along the bottom faces of the grooves 116, 126 of the cushions 112, 122.

Anchor Portion

As illustrated in FIG. 6, two of the anchor portions 34 are disposed side-by-side in the front-rear direction, standing out from the front face of the base section 14 toward the upper side. As illustrated in FIG. 5, one anchor portion 34 and the other anchor portion 34 are disposed on either side of the center line L1. The notches 16A, 16B are disposed between the one anchor portion 34 and the other anchor portion 34. Since each of the anchor portions 34 is configured with a similar shape, explanation follows regarding the one anchor portion 34.

Figure 9:
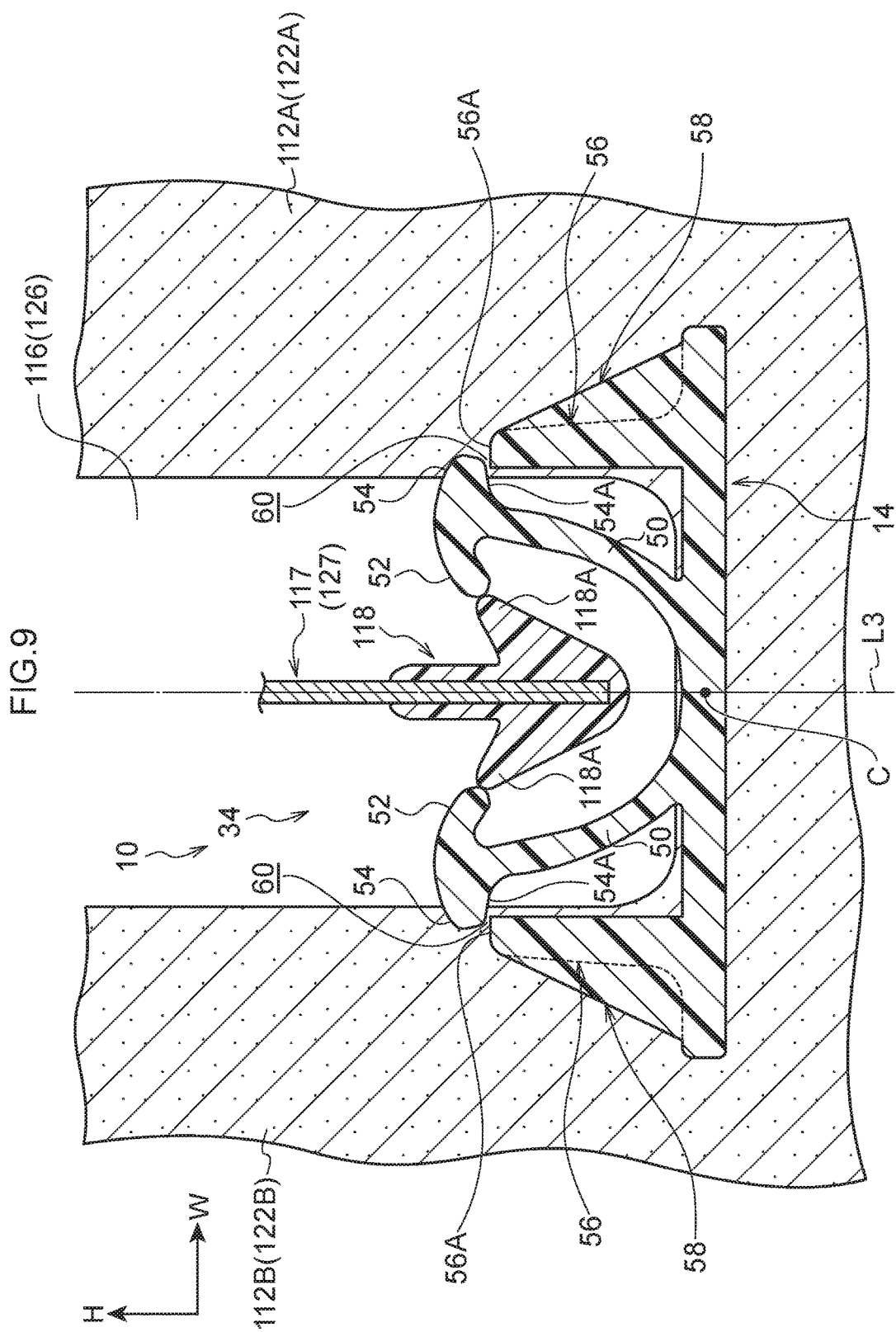
FIG. 9 is a cross-section illustrating a clip according to an exemplary embodiment of the present invention.

As illustrated in FIG. 2 and FIG. 9, each anchor portion 34 includes a pair of extension portions 50 extending out from the front face of the base section 14 and disposed facing each other, and a pair of anchor claws 52 that are respectively formed to leading ends of the extension portions 50 and that fit around and anchor the suspenders 118 mentioned above.

The pair of extension portions 50 and the pair of anchor claws 52 are symmetrical to each other about a center line L3 extending in the up-down direction of the base section 14 (see FIG. 7). Note that the center line L3 passes through the center C (centroid) of the base section 14 and is a straight line extending in the up-down direction.

The pair of extension portions 50 are angled toward the width direction outside so as to be further apart from each other at leading end than at base end thereof. The respective extension portions 50 are curved so as to protrude toward the width direction outside. The respective extension portions 50 are capable of undergoing elastic deformation such that the leading ends of the respective extension portions 50 move away from each other.

Furthermore, the anchor claws 52 are formed to the leading ends of the respective extension portions 50 such that leading edges of the pair of anchor claws 52 approach each other.

In this configuration, in a state in which the clips 10 are disposed in the cushions 112, 122, as illustrated in FIG. 7, the anchor portions 34 are disposed in the grooves 116, 126 of the cushions 112, 122, and are exposed from the foam body to the exterior.

In order to fit the pair of anchor claws 52 around and anchor the suspender 118, as illustrated in FIG. 4 and FIG. 10, the respective extension portions 50 elastically deform such that the pair of anchor claws 52 move away from each other.

Other

Protrusions 54 are respectively formed to the leading ends of the pair of extension portions 50.

As illustrated in FIG. 10, the protrusions 54 protrude out toward the opposite sides to the side at which the extension portions 50 face each other (opposite side to the side formed with the anchor claws 52), and each protrusion 54 is formed with a lower face 54A (an example of a contact face) facing the lower side.

The clip 10 includes pairs of upstanding portions 56 that extend out from the base section 14 toward the upper side in the up-down direction (an example of an upstanding direction), and that are respectively disposed on the width direction outside of each extension portion 50. Leading end portions of each pair of upstanding portions 56 are formed with top faces 56A facing the upper side in the up-down direction.

Furthermore, a triangular rib 58 supporting the upstanding portion 56 is formed on the width direction outer side of each upstanding portion 56.

In this configuration, in a state in which the clips 10 are disposed in the cushions 112, 122, as illustrated in FIG. 7, the upstanding portions 56 are disposed inside the cushions 112, 122.

When the extension portions 50 elastically deform such that the pair of anchor claws 52 move away from each other, the lower faces 54A of the protrusions 54 can contact the top faces 56A of the upstanding portions 56 so as to make face-to-face contact.

Gaps 60 are formed between the respective lower faces 544 and top faces 56A in a state in which the respective extension portions 50 have undergone elastic deformation in order to insert and anchor the suspender 118 between the pair of anchor claws 52 (see FIG. 9).

Operation

Explanation follows regarding the attachment operation of the suspender 11, which is fixed to the sheet members 117, 127, to the clip 10, and regarding the weld lines that have developed at the periphery of the through holes 36, 38.

Note that weld lines refers to portions where the flow of molten resin in the mold has merged and fused in the injection molding process, and are locations more liable to break due to external load than other portions.

Attachment Operation

Figure 8:
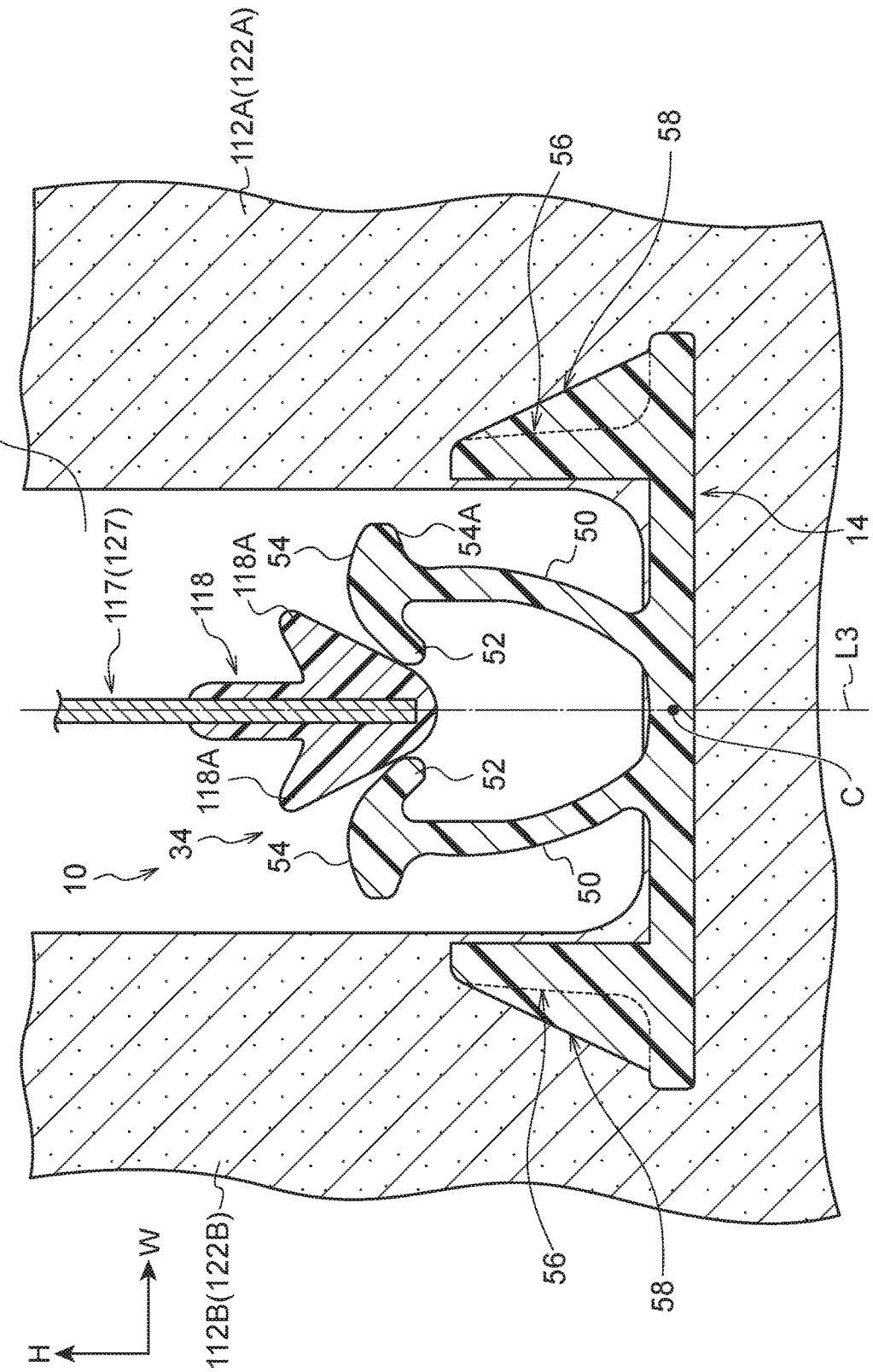
FIG. 8 is a cross-section illustrating a clip according to an exemplary embodiment of the present invention.

When attaching the suspender 118 to the clips 10, as illustrated in FIG. 8, the suspender 118 is inserted into the groove 116, 126. When the suspender 118 is inserted into the groove 116, 126, the tapered leading end portion of the suspender 118 contacts the pairs of anchor claws 52 of the respective clips 10.

When the suspender 118 is inserted further toward the bottom of the groove 116, 126, as illustrated in FIG. 9, the pairs of anchor claws 52 are pressed by the suspender 118 and the extension portions 50 elastically deform such that the pairs of anchor claws 52 move away from each other. The suspender 118 is thereby allowed to pass between the pairs of anchor claws 52. When this occurs, the lower faces 54A of the protrusions 54 and the top faces 56A of the upstanding portions 56 are not in contact, and the gap 60 is formed between each lower face 54A and top face 56A.

When the protrusions 118A of the suspender 118 pass between the pairs of anchor claws 52, as illustrated in FIG. 10, the extension portions 50 undergo elastic recovery, such that the pairs of anchor claws 52 fit around and anchor the suspender 118. The suspender 118 is thereby attached to the clip 10.

The attachment operation to attach e suspender 118 to the clip 10 is thereby completed.

Weld Lines

Explanation follows regarding weld lines L10 that have developed at the periphery of the through holes 36, 38.

First, explanation follows regarding weld lines L20 of a clip 300 according to a comparative example.

Figure 15:
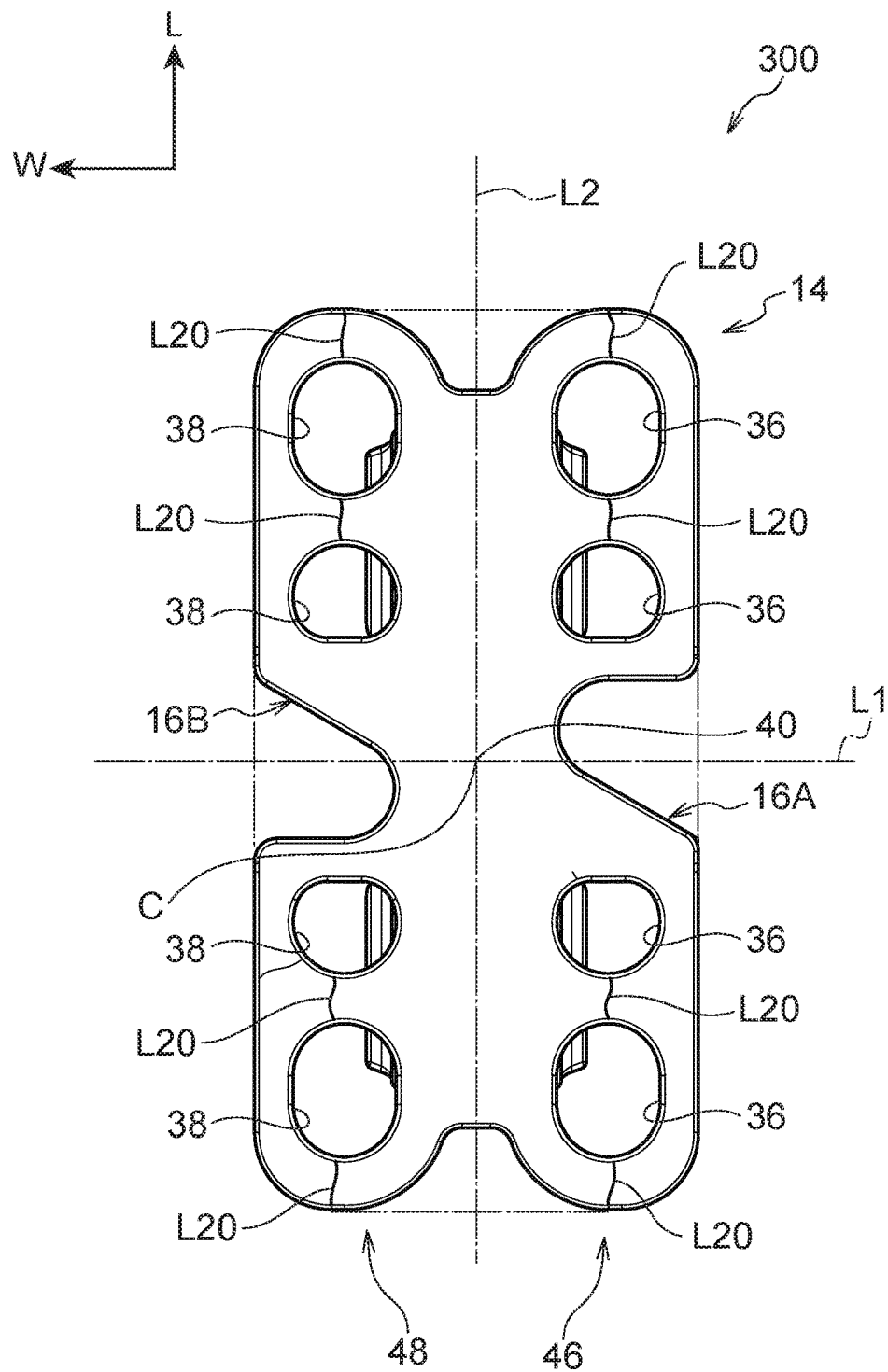
FIG. 15 is a bottom view illustrating a clip according to a comparative example.

Explanation regarding the clip 300 mainly focuses on locations differing from those of the clip 10. As illustrated in FIG. 15, the clip 300 is formed without the step portions 42, 44, and a plate thickness of the base section 14 is uniformly set to 1.0 mm.

All of the weld lines L20 that have developed at the periphery of the through holes 36, 38 of the clip 300 extend in the front-rear direction.

However, as illustrated in FIG. 1, the weld lines L10 that have developed at the periphery of the through holes 36, 38 of the clip 10 of the present embodiment are angled with respect to the front-rear direction and the width direction, so as to spread out from the gate mark 40. The step portions 42, 44, which change the plate thickness of the base section 14, are formed to the clip 10, and the step portions are formed by curved shapes. Thus, during injection molding, resin is injected into the mold from the gate positioned at the central portion of the base section and flows in the front-rear direction and the width direction of the base section. The flow of the resin is changed depending on the shape of the curve of the step portions and development of the weld lines L10 is attributed to such flow of the resin. Namely, the flow of resin during injection molding is varied compared to that of the clip 300.

CONCLUSION

As explained above, the weld lines L10 that have developed at the periphery of the through holes 36, 38 of the clip 10 according to the present exemplary embodiment are angled with respect to the front-rear direction and the width direction, as illustrated in FIG. 1. Namely, the weld lines L10 that have developed at the periphery of adjacent through holes 36, 38 differ from those of the clip 300, and do not extend in the same direction as viewed along the plate thickness direction of the base section 14. Damage to the clip 10 originating at the weld lines can thereby be suppressed. Supposing that weld lines were to extend in the same direction as viewed along the plate thickness direction of the base section 14, then the clip might break along these weld lines.

Figure 14:
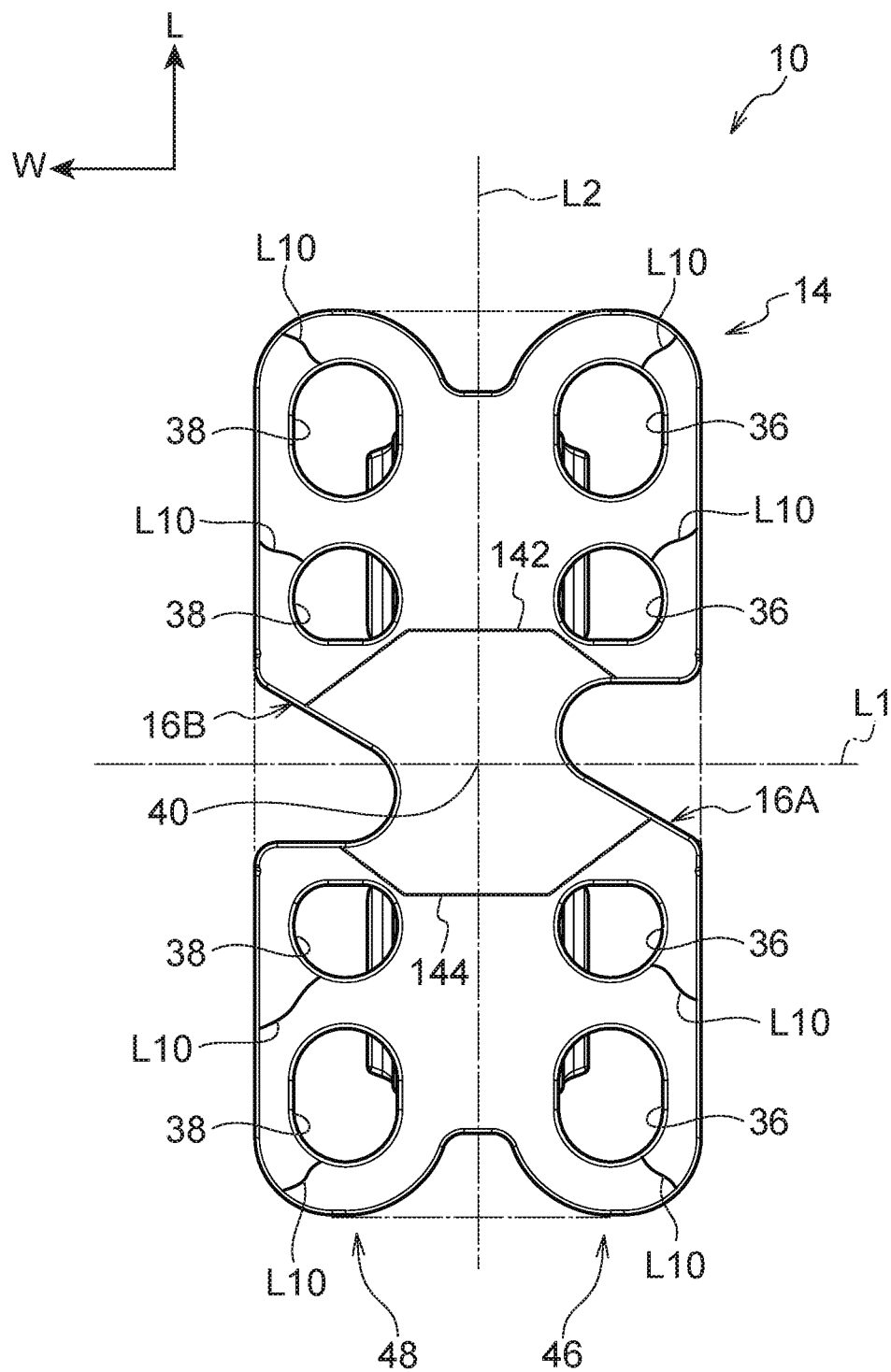
FIG. 14 is a bottom view illustrating a clip according to a modified exemplary embodiment of the present invention.

Note that detailed explanation has been given regarding a particular exemplary embodiment of the present invention. However, the present invention is not limited by the exemplary embodiment, and it would be obvious to a skilled practitioner that various other embodiments may be implemented within a range of the present invention. For example, although not explained in the exemplary embodiment above, as illustrated in FIG. 14, step portions 142, 144 may be formed by straight line portions and angular portions as viewed along the plate thickness direction of the base section 14.

What is claimed is:

1. A cover anchor clip comprising:
   a base section having a plate shape extending in one direction, that is formed with through holes into which a foam body enters, and that is configured to be retained in the foam body; and
   an anchor portion including:
      a pair of extension portions that extend upward from a surface of the base section and that are disposed facing each other, and
      a pair of anchor claws that are formed at respective leading ends of the pair of extension portions, and that are configured to anchor an anchored member attached to a cover for covering the foam body by sandwiching the anchored member therebetween,
   wherein the through holes formed at the base section are aligned in the one direction, and a plurality of hole-rows formed by the through holes aligned in the one direction are separated by a spacing in an intersection direction intersecting the one direction,
   a gate mark that indicates an injection port for resin material during molding being formed at a back face of the base section between adjacent hole-rows of the hole-rows, and
   a plate thickness changing portion at which a thickness of the base section changes being formed between the gate mark and the through holes, as viewed from the back face of the base section along a plate thickness direction of the base section,
   wherein the plate thickness changing portion is formed at one side and at another side of the gate mark in the one direction at the back face of the base section, with the gate mark positioned between the plate thickness changing portions, and
   wherein a portion at the back face of the base section between the plate thickness changing portion at the one side and the plate thickness changing portion at the other side is protruded from a remaining portion at the back face of the base section.

2. The cover anchor clip of claim 1, wherein the plate thickness changing portion is shaped as a curved line as viewed along the plate thickness direction.

3. The cover anchor clip of claim 1, wherein the plate thickness changing portion is shaped by a straight line portion and an angular portion as viewed along the plate thickness direction.

4. The cover anchor clip of claim 1, wherein the plate thickness changing portion extends in the intersection direction.

5. The cover anchor clip of claim 1, wherein the plate thickness of the base section between two plate thickness changing portions is thicker than that of other portions of the base section.

6. The cover anchor clip of claim 1, wherein weld lines, which are formed by resin material being merged and fused with another resin material at a time of injection molding, are left at peripheries of the through holes and extend and incline with respect to the one direction and the intersection direction.

* * * * *